(12) United States Patent
Grimes

(10) Patent No.: US 7,008,165 B1
(45) Date of Patent: Mar. 7, 2006

(54) DOOR LIFTING APPARATUS AND METHOD

(76) Inventor: Mark Grimes, 9305 Hwy. 9 South, Centre, AL (US) 35960

( * ) Notice: Subject to any disclaimer, the term of this patent is extended or adjusted under 35 U.S.C. 154(b) by 27 days.

(21) Appl. No.: 10/836,381

(22) Filed: Apr. 30, 2004

(51) Int. Cl.
*B66F 11/00* (2006.01)

(52) U.S. Cl. .................... 414/589; 29/281.1; 269/17; 414/684.3; 414/800

(58) Field of Classification Search ............... 414/589, 414/590, 684.3, 800; 269/17; 29/281.1
See application file for complete search history.

(56) References Cited

U.S. PATENT DOCUMENTS

| | | | |
|---|---|---|---|
| 3,806,090 | A | 4/1974 | Sasnett et al. |
| 4,042,208 | A | 8/1977 | Arakaki |
| 4,180,252 | A | 12/1979 | Cushenbery |
| 4,278,244 | A | 7/1981 | Carter |
| 4,456,421 | A | 6/1984 | Robson |
| 4,531,720 | A | 7/1985 | Soder |
| 4,810,151 | A | 3/1989 | Shern |
| 5,181,307 | A | 1/1993 | Kitahama et al. |
| 5,269,501 | A | 12/1993 | Liegel et al. |
| 5,551,980 | A | 9/1996 | Turnbo |
| 5,725,205 | A | 3/1998 | O'Berg |
| 5,762,348 | A | 6/1998 | Echternacht |
| 6,024,351 | A | 2/2000 | Metoyer |
| 6,199,849 | B1 | 3/2001 | Lebwohl et al. |
| 6,409,433 | B1 | 6/2002 | Hubbell et al. |
| 6,409,455 | B1 | 6/2002 | Moseley |
| 6,439,561 | B1 | 8/2002 | Ausilio |
| 6,579,051 | B1 | 6/2003 | Echternacht |

*Primary Examiner*—Donald W. Underwood
(74) *Attorney, Agent, or Firm*—Rankin, Hill, Porter & Clark LLP; Vincent Ciamacco

(57) ABSTRACT

A door lifting apparatus includes a frame and a lift mechanism. The lift mechanism includes a slide assembly and a lever assembly. The slide assembly includes a vertical bar, a door support beam supporting a plurality of door holders, and a horizontal bar that are movable together vertically up and down relative to the frame as the lever assembly is moved between a lifted position, an intermediate position, and a lowered position. The vertical bar is associated with a cam plate secured to the frame such that the vertical bar, and the door support beam and door secured thereto, pivots as the lever assembly is moved between the lifted and the lower position.

19 Claims, 7 Drawing Sheets

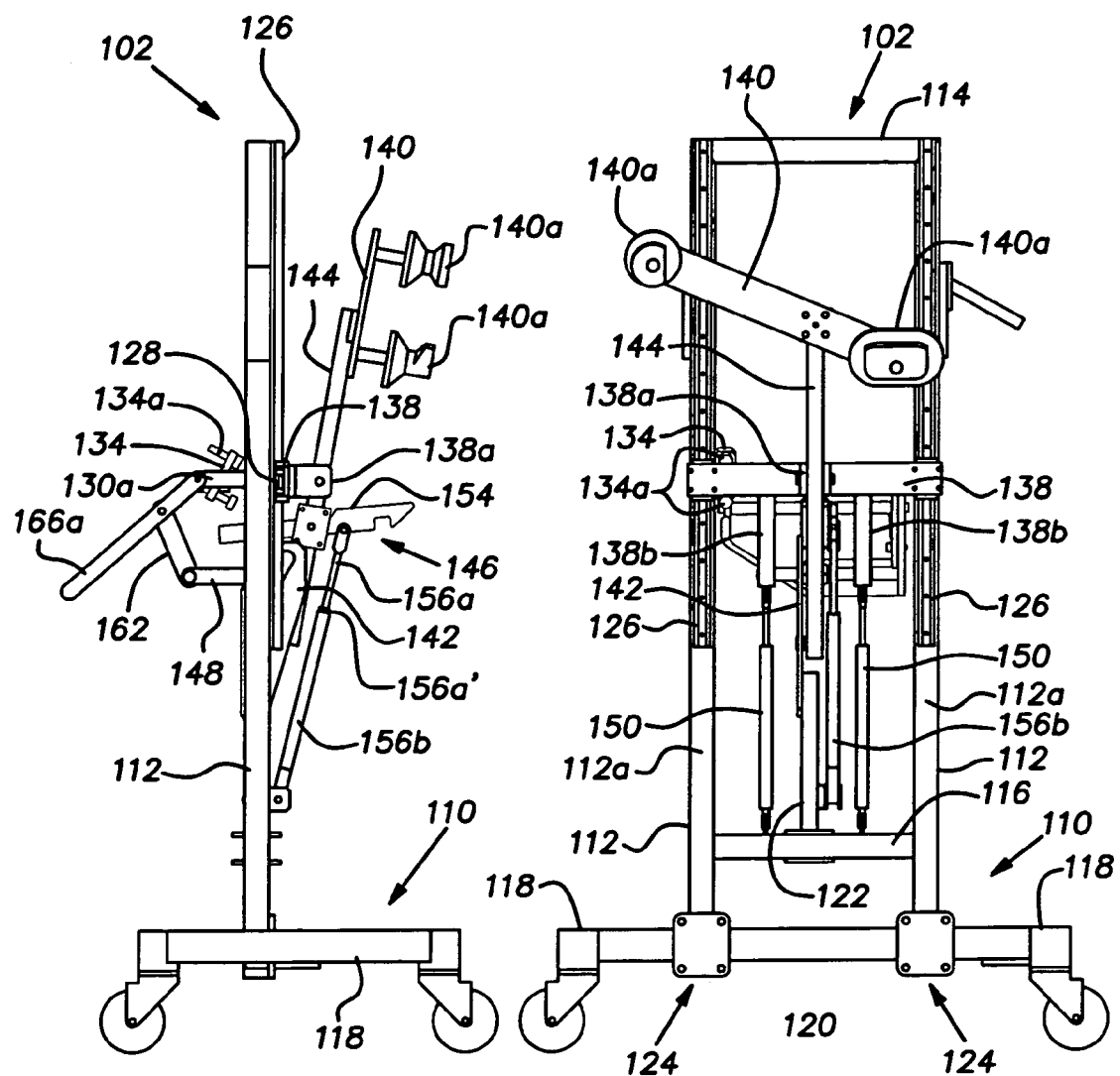

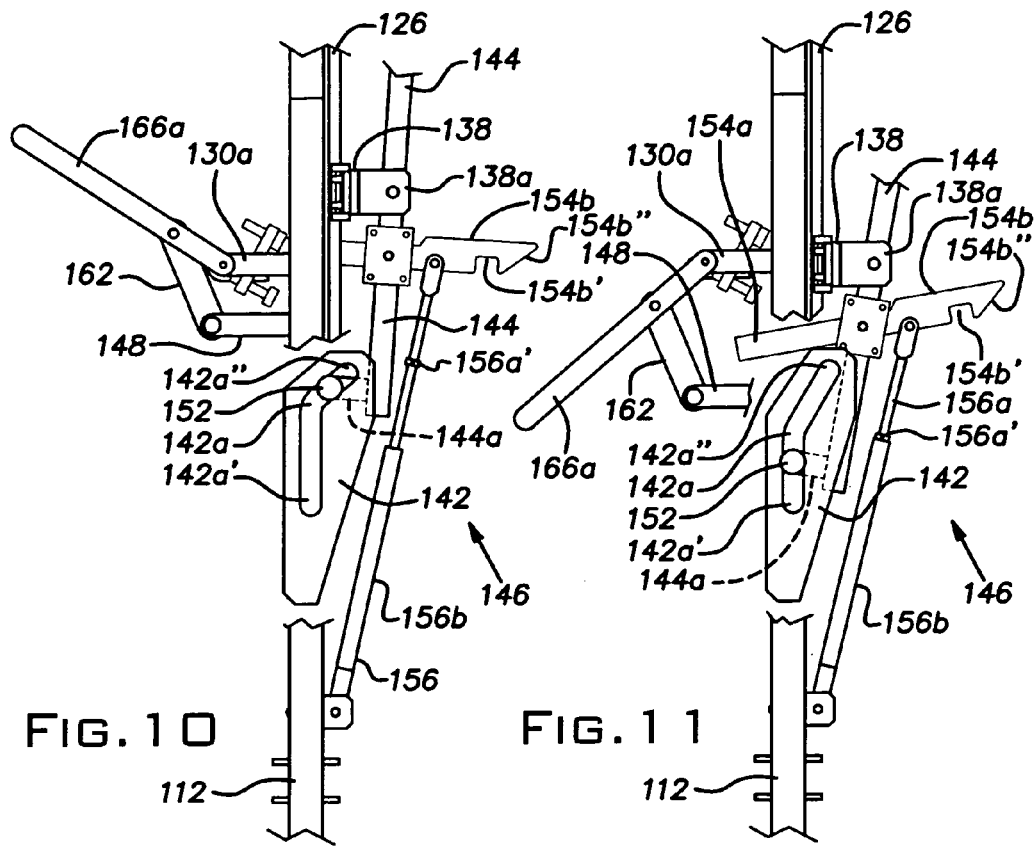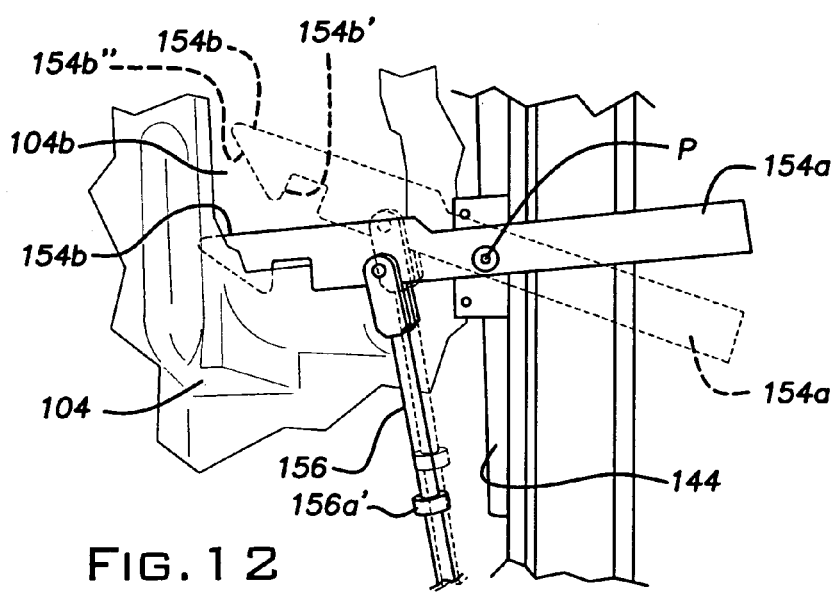

DOOR LIFTING APPARATUS AND METHOD

BACKGROUND OF THE INVENTION

1. Field of the Invention

The present invention generally relates to an apparatus for lifting a door, and more particularly, toward an apparatus for lifting and transporting an automobile door.

2. Description of Related Art

During the manufacture of a vehicle, it may be necessary to remove a vehicle door and transport the door to another location for subsequent assembly before reattaching the door to the vehicle. As vehicle doors are usually heavy, apparatuses that can assist in the lifting and transport of vehicle doors are often employed for this task. Several apparatuses are currently used for such purposes. However, these apparatuses can be expensive to purchase and maintain, and can be cumbersome to operate.

One such apparatus employs a pneumatic assist arm attached to a door holding apparatus. The assist arm extends from an overhead support assembly, and the lifted door hangs in the air once it is removed from the vehicle. While such devices work satisfactorily, they require significant expenditures to install and maintain, and are not readily adaptable to changes in the assembly layout. Moreover, such devices are not adapted to take a door, which is in a substantially vertical position or orientation on a vehicle, and place the door in an angled or tilted position on a support platform, as is desired. Rather, operator intervention may be required to angle or tilt the door as it is placed onto the support platform.

Therefore, there exists a need in the art for a door lifting apparatus with a simple design having ergonomic benefits and requiring little maintenance. There also exists a need for a compact door lifting apparatus that is easy to operate and maneuverable in limited access areas. There further exists a need in the art for an apparatus that will receive a door in a substantially vertical orientation and reposition the door into a tilted orientation for placement on a support platform.

SUMMARY OF THE INVENTION

The present invention is directed toward an apparatus and method for lifting and transporting a vehicle door and is related to the door lifting apparatus and method set forth in applicant's co-pending application Ser. No. 10/455,474, which was filed on Jun. 5, 2003, the disclosure of which is expressly incorporated herein in its entirety. The present invention is further directed toward an apparatus that will receive a door in a substantially vertical orientation and reposition the door into a tilted orientation for placement on a support platform.

In accordance with the present invention, a door lifting apparatus has a frame with a pair of upright supports and a rail extending along each upright support. A lift mechanism, which includes a slide assembly and a lever assembly, is mounted on the frame. The slide assembly includes a plurality of holders, a hook arm, and a plurality of glides. The holders and hook arm are operable to engage and support a door, while the glides guide the slide assembly along the rails. The lever assembly is secured to the slide assembly so that pivotal movement of the lever assembly moves the slide assembly vertically along the rails and relative to the upright supports. The apparatus further includes a biasing device extending between the frame and the slide assembly and serving to assist in lifting and lowering the door.

In further accordance with the present invention, a cam plate is associated with the slide assembly and operable to cause a vertical bar of the slide assembly to pivot as the slide assembly moves vertically. Pivoting of the vertical bar causes the door, which is disposed upon the holders mounted to an upper end of the vertical bar and held at a lower end by the hook arm, to pivot or rotate into an angled or tilted orientation.

In accordance with the inventive method of lifting and supporting a door, the lever assembly is operated to move the slide assembly into an insertion position in which the holders and the hook arm are aligned with openings formed in the door. The lever assembly is retained in the insertion position by cooperation between a latch and a stop. The holders and hook arm are inserted into the door openings, the lever assembly is moved into a lifted position, the hinge pins are removed from the door, and the door is removed from the vehicle. The lifted door may be transported by simply pushing the door lifting apparatus across a floor. When at a desired location, the lever assembly may be pivoted so as to move the slide assembly vertically downward from the lifted position, thereby lowering the holders and the door into a lowered position.

In further accordance with the inventive method, as the slide assembly moves toward the lowered position, the vertical bar pivots so as to cause the door to be in an angled or tilted orientation for placement on a support platform. As the lever assembly is pivoted or lowered toward the lowered position, the hook arm is released from the door opening, and further downward movement of the lever assembly into the lowered position frees the door holders from the door openings, permitting the apparatus to be disengaged from the door.

BRIEF DESCRIPTION OF THE DRAWINGS

These and further features of the invention will be apparent with reference to the following description and drawings, wherein:

FIG. 6 is a left side elevational view of the door lifting apparatus according to the present invention with the lever assembly shown in a lowered position;

FIG. 7 is a front elevational view of the door lifting apparatus according to the present invention in the lowered position;

FIG. 10 is a side elevational view of the apparatus, with portions broken away, with the lever assembly in the intermediate position, illustrating interaction of a cam plate and vertical bar of the slide assembly;

FIG. 11 is a side elevational view similar to that of FIG. 10, but showing the lever assembly in the lowered position;

FIG. 12 is a partial perspective view of a portion of a hook arm illustrating interaction between the hook arm and the door;

DETAILED DESCRIPTION OF THE PREFERRED EMBODIMENTS

Figure 1:
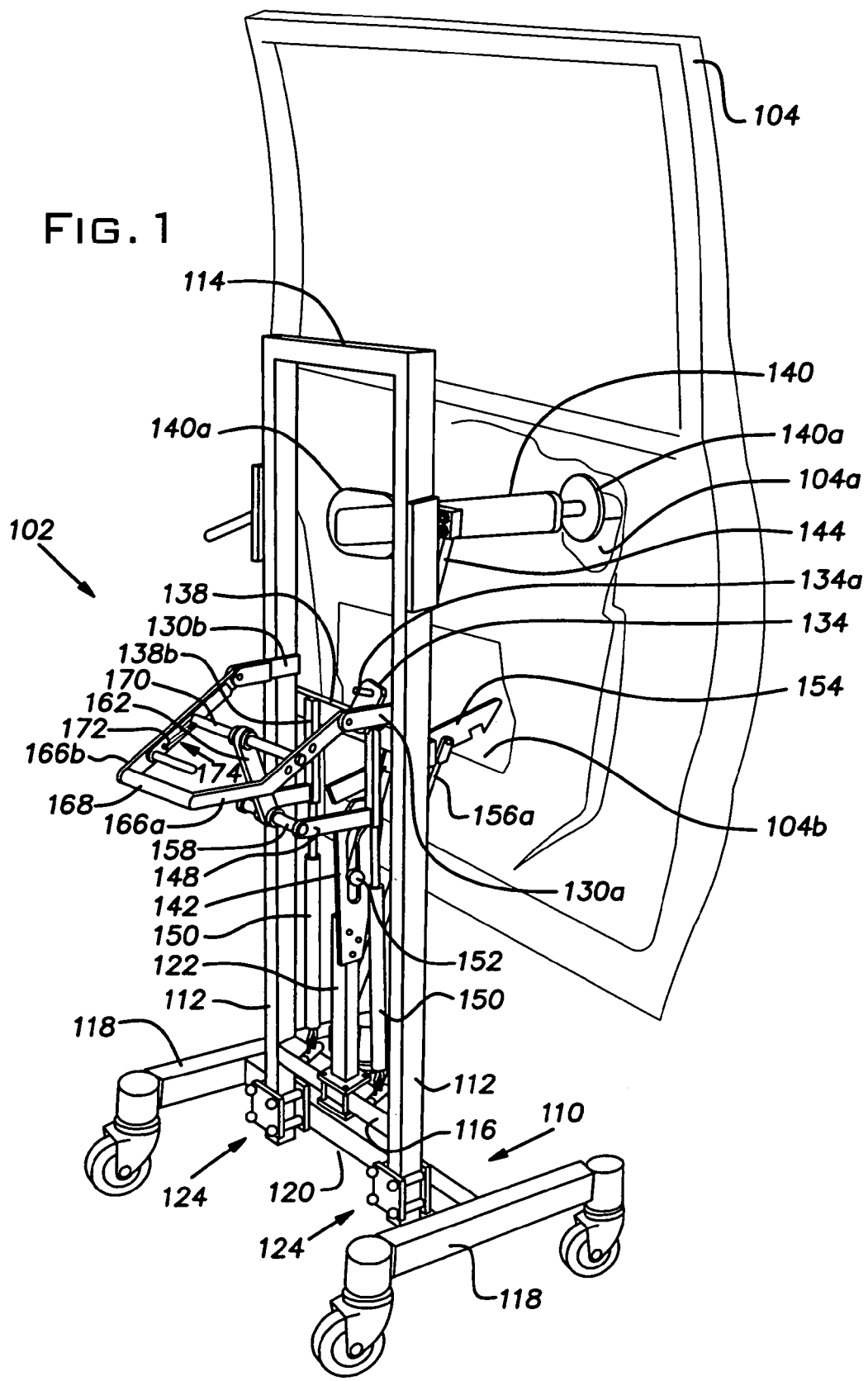
FIG. 1 is a perspective view of a rear and left side of the door lifting apparatus according to the present invention, with a door disposed thereon and held in a lifted position.

With reference to the drawing figures, a door lifting and transporting apparatus 102, which is operable to lift and support a vehicle door 104, includes a frame and a lifting mechanism. The frame includes a base 110, a pair of upright supports 112, an upper support 114, and a lower support 116. The lifting mechanism includes a slide assembly and a lever assembly, described hereinafter.

The base 110 includes a pair of support bars 118 that are interconnected by a cross bar 120. Each support bar 118 has a caster or wheel secured to each end thereof. The cross bar 120 is secured to the support bars 118 at locations that are offset from the midpoint of the support bars 118, as illustrated.

A bottom end of each upright support 112 is adjustably secured to the cross bar 120, while a top end of each upright support 112 is rigidly interconnected by the upper support 114. The lower support 116 extends between and rigidly interconnects the upright supports 112 at a location vertically spaced from the base 110, as illustrated. An upright mounting bar 122 is affixed to, and extends upwardly from, the lower support 116 at a location between the upright supports 112, as illustrated. A cam plate 142, described hereinafter, is affixed to the mounting bar 122 and extends upwardly therefrom, and serves to operably interconnect a portion of the slide assembly to the frame.

The upper and lower supports 114, 116 are parallel to the cross bar 120. A clamping assembly 124 is provided to secure the bottom end of the upright supports 112 to the cross bar 120. The clamping assembly 124 includes a backing plate, which is permanently affixed to the cross bar 120, and a clamping plate, which is mounted over the lower end of the associated upright support 112 and aligned with the backing plate, as illustrated. Bolts extend through the plates and are tightened to clamp the upright support 112 to the cross bar 120. As will be appreciated, the clamping assembly 124 permits the height of the apparatus 102 to be adjusted, as may be necessary to accommodate doors for different vehicles.

Each upright support 112 has a front face 112a, and a bar-like rail 126 extending along the front face 112a. Each rail 126 is attached to the front face 112a of the associated upright support 112 at numerous locations along its length by conventional mechanical fasteners. A glide 128 is slidably received by each rail 126 and slidably moves along the rails 126. Suitable glide and rail subassemblies are available from Rollmann Trading Company of Bangalore, India under the tradename "THK" (www.rollmannbearing.com). Upper and lower stops are optionally provided at the upper and lower ends of the rails 126 to limit the range of vertical motion of the glides 128 and, hence, the lifting mechanism.

First and second rearwardly extending fixed brackets 130a, 130b, are affixed to, and extend rearwardly from, the upright supports 112 at a suitable location along the length of the upright supports 112 and rails 126. Each of the fixed brackets 130a, 130b have a proximal end that is affixed to an inner surface of the associated upright support 112 and a distal end that pivotally supports the lever assembly of the lift mechanism, as will be described more fully hereinafter.

A plate 134 is rigidly secured, such as by welding, to the first fixed bracket 130a at a location slightly rearward of the associated upright support 112. The plate 134 has set screws 134a threadably secured therethrough and extending therefrom. The set screws 134a are adjustable so as to vary or alter the length or distance the screws 134a project from the plate 134. The screws 134a serve as a stop to limit movement of the lever assembly toward the frame, as will be apparent from the following, and help to define the lifted position of the apparatus 102.

As noted hereinbefore, the lifting mechanism includes a slide assembly and the lever assembly. The slide assembly includes a lower bar 138, a door support beam 140, a vertical bar 144, a hook assembly 146, second brackets 148, and a second rod 158. The slide assembly is movably secured to the rails 126 by the glides 128, which are affixed to each end of the lower bar 138. The glides 128, which guide the slide assembly as the slide assembly is moved vertically along the rails 126 relative to the upright supports 112, are preferably formed from a low friction, wear resistant material.

The vertical bar 144 interconnects the lower bar 138 and the door support beam 140 such that the lower bar 138, vertical bar 144, and door support beam 140 move vertically with one another. The vertical bar 144 is preferably disposed intermediate the upright supports 112 while the lower bar 138 is oriented generally perpendicular to the vertical bar 144 and parallel to the cross bar 120. The door support beam 140 is adjustably connected to an upper end of the vertical bar 144, as described hereinafter, and moves vertically with the rest of the slide assembly. The vertical bar 144 is pivotally connected to the lower bar 138 such that, as the slide assembly moves up and down, the vertical bar 144 pivots or rotates, which causes the door support beam 140 to move vertically and laterally relative to the upright supports 112.

The lower bar 138 has a pair of mounting brackets 138a extending forwardly therefrom and a pair of extensions 138b welded to a rear surface thereof. The vertical bar 144 is pivotally mounted between the mounting brackets 138a, as will be apparent from the following discussion. The extensions 138b project downwardly from the lower bar 138 and are disposed on relatively opposite sides of the vertical bar 144, as illustrated. The extensions 138b rigidly interconnect the lower bar 138 with second brackets 148 of the lever assembly and serve as mounting points for a biasing device 150.

The biasing device 150 extends between the lower support 116 of the frame and the second brackets 148 and assists in lifting and lowering the door 104 by exerting an upward force on the slide assembly. The biasing device 150 may be formed by a pair of air springs (illustrated) or constant-force mechanical springs. The biasing force provided by the biasing device 150 helps to support the slide assembly when the door lifting apparatus 102 engages a door 104, and allows the door 104 to be raised and lowered with less effort by the operator.

The door support beam 140 is angularly or rotatably adjustably mounted to the vertical bar 144 so as to place door holders 140a, which are secured adjacent each end thereof, in a desired orientation relative to upper openings 104a in the door 104. As will be appreciated, the holders 140a are preferably disposed in a location inset from the casters (for balance) while being positioned and adapted to extend through the upper door openings 104a, and to support the door 104 during lifting and lowering. The holders 140a may be repositioned along the length of the door support beam 140 to accommodate door openings 140a that are at varying distances from one another. The beam 140 is preferably attached to the vertical bar 144 by bolts that extend through slotted holes in the vertical bar 144 so as to allow for angular adjustment of the beam 140 relative to the bar 144 to accommodate door openings that are at varying heights.

As noted hereinbefore, the cam plate 142 is affixed to one side of the upright mounting bar 122 and extends upwardly therefrom. The cam plate 142 defines an elongated opening 142a having a camming surface over which rides a cam pin 152, which extends laterally from a plate 144a extending rearwardly from a lower end of the vertical bar 144. The elongated opening 142a includes a lower portion 142a' and an upper portion 142a". The lower portion 142a' of the opening 142a is generally vertically oriented, although inset from a vertical plane extending through a pivotal mounting point (P) between the vertical bar 144 and the lower bar mounting brackets 138a. The upper portion 142a" of the opening 142a is at an angle to vertical, as illustrated, and includes an upper end that is offset from the vertical plane extending through the pivotal mounting point (P) of the vertical bar 144 by a distance equal to the length of the vertical bar rearwardly extending plate 144a, described further hereinafter. As will be appreciated from the following discussion, sliding engagement between the cam pin 152 and the camming surface surrounding the cam plate opening 142a causes the vertical bar 144 to pivot about its pivotal mounting point (P) as the slide assembly is moved between the lifted position and the lowered position.

The vertical bar 144 is mounted to the frame for sliding vertical motion and for pivotal motion relatively toward and away from the frame. The lower end of the vertical bar 144 includes the rearwardly extending plate 144a from which laterally extends the cam pin 152, as illustrated. Accordingly, the upper end of the vertical bar 144 is affixed to the door support beam 140, the lower end of the vertical bar 144 is slidingly and cammingly engaged with the cam plate 142 via the cam pin 152, and the mid-portion of the vertical bar 144 is pivotally connected to the mounting brackets 138a of the lower bar 138. As such, when the slide assembly is lowered from the lifted position toward the lowered position, the lower end of the vertical bar 144 moves laterally toward the frame while the upper end of the vertical bar 144, and the door holders 140a associated therewith, move relatively farther away from the frame.

The hook assembly 146 is pivotally secured to the vertical bar 144 at a location between the camming pin 152 and the pivotal mounting point (P), as illustrated. The hook assembly 146 includes a hook arm 154 and a hook support 156.

The hook arm 154 includes a rearwardly extending handle portion 154a and a forwardly extending door engaging portion 154b. The door engaging portion 154b includes a downwardly facing notch 154b' and an angled leading surface 154b". The notch 154b' is adapted to receive an upwardly directed edge surface defining a lower door opening 104b. The angled leading surface 154b" facilitates insertion of the door engaging portion 154b into the lower door opening 104b and, thus, securing of the hook arm 154 to the door 104, as will be apparent from the following. The handle portion 154a may be grasped and pushed downwardly to manually disengage the notch 154b' from the door 104, if necessary.

A lower end of the hook support 156 is secured to the upright mounting bar 122 while an upper end of the hook support 156 is pivotally secured to the hook arm 154 at a location intermediate the vertical bar 144 and the notch 154b'. Preferably, the hook support 156 is a telescoping-type member having a sliding inner portion 156a, which has a free end attached to the hook arm 154, and a fixed outer portion 156b, which has a free end attached to the upright mounting bar 122. The hook support 156 is movable between a relatively retracted position and a relatively extended position, and may be biased toward the retracted or horizontal position.

An annular stop member 156a' is affixed around the hook support inner portion 156a and serves to limit retraction or insertion of the inner portion 156a into the outer portion 156b. Accordingly, when the slide assembly is moved into a lowered position, the hook arm 154 will be forced to pivot or rotate upwardly (FIG. 12), via action of the hook support 156 (i.e., bottoming out of the inner portion stop 156a' on the outer portion 156b), into a disengaged position, as illustrated.

In use, when the door 104 is being supported by the holders 140a, the door 104 is engaged with and rests against the hook arm 154, which thus serves to laterally support the door 104 to prevent the door 104 from swinging while being rotated into an angled or tilted position as the slide assembly is lowered. Counterbalancing is further provided by the offset of the upright supports 112 relative to the middle of the base so as to provide a stable support for the door 104.

The second brackets 148 are illustrated as having proximal ends rigidly affixed to the lower bar extensions 138b and distal ends that are interconnected by the second rod 158, for purposes that will be apparent from the following description. The second brackets 148 thus extend rearwardly from the extensions 138b and the lower bar 138, and the second brackets' distal ends are disposed at a location that is rearward of the distal ends of the first brackets 130a, 130b.

Accordingly, the slide assembly, which includes the door support beam 140, lower bar 138, vertical bar 144, second brackets 148, hook arm 154, and second rod 158, defines a unitary framework that is slidably movable along the rails 126 relative to the upright supports 112. In this regard, the glides 128 may also be considered to be part of the slide assembly.

Figure 8:
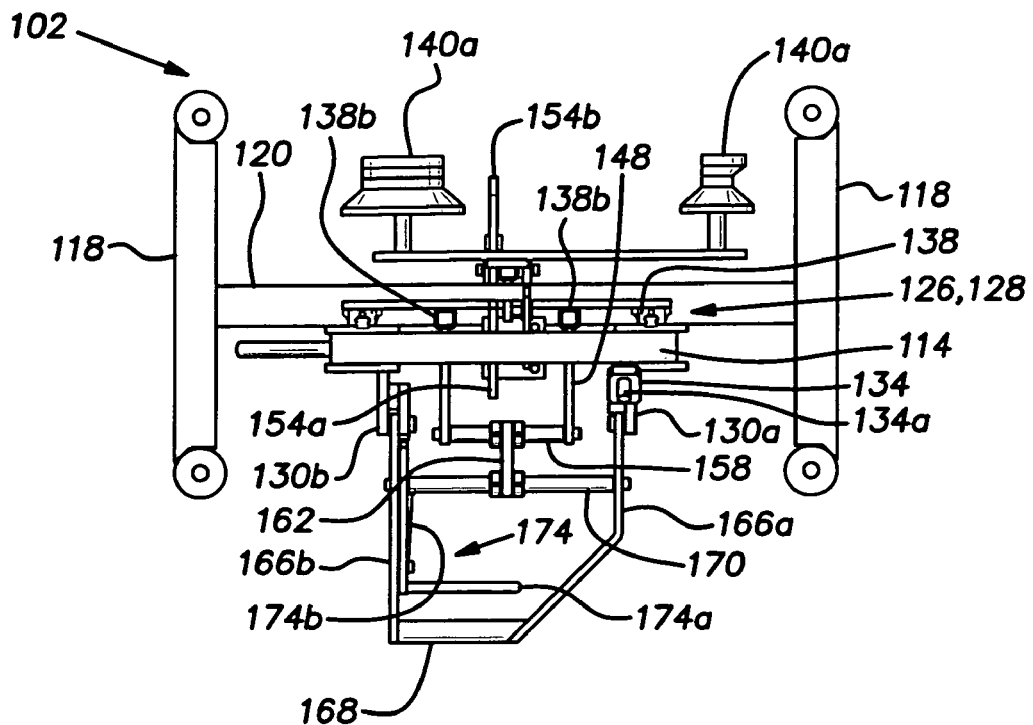
FIG. 8 is a top plan view of the apparatus.
Figure 9:
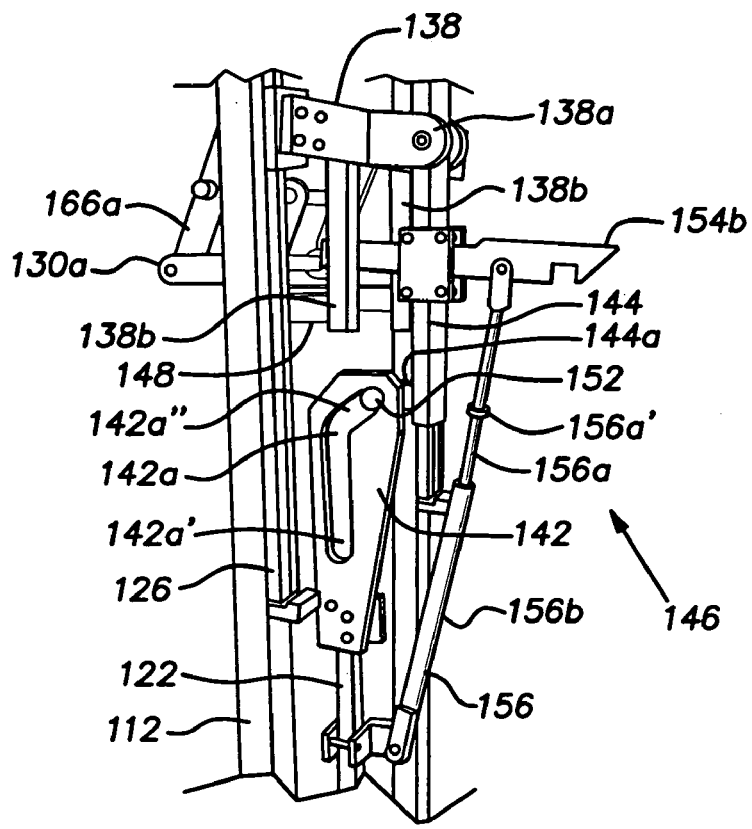
FIG. 9 is a partial front and left side perspective view of the apparatus, with the lever assembly shown in the lifted position.
Figure 13:
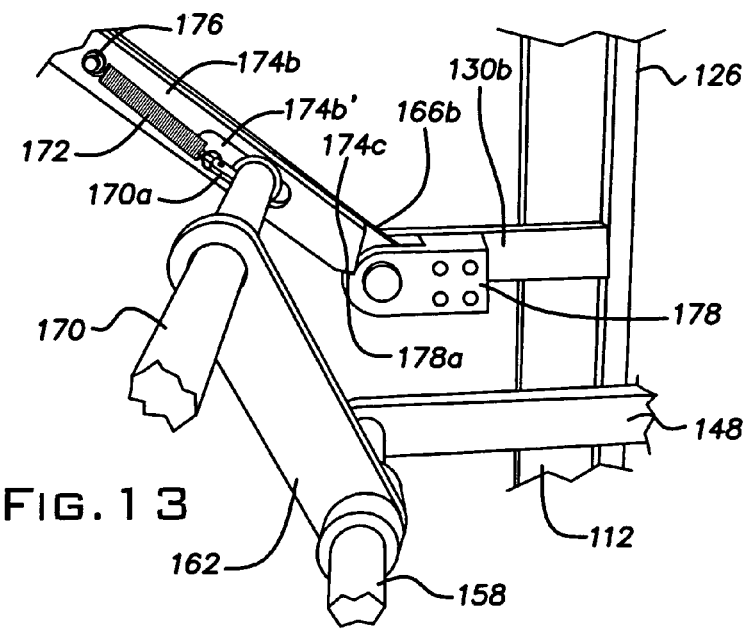
FIG. 13 is a partial perspective view of the lever assembly, illustrating a latching assembly in a latched condition with the lever assembly in the intermediate position; and, FIGS. 14–16 are partial elevational views showing operation of the latching assembly as the lever assembly moves from the lifted position (FIG. 14) to the intermediate position (FIG. 15) and into the lowered position (FIG. 16).

As shown best in FIGS. 1 and 8, the lever assembly includes a handle assembly, a link arm 162, and a latching assembly. The handle assembly includes first and second legs 166a, 166b, a grip 168, and a first rod 170. A proximal end of the first leg 166a is pivotally secured to the first fixed bracket 130a, while a proximal end of the second leg 166b is pivotally secured to the second fixed bracket 130b. Distal ends of each leg 166a, 166b are affixed to an associated end of the grip 168. The first rod 170 extends between and interconnects the handle legs 166a, 166b at a location relatively close to the legs' proximal ends. In the illustrated and preferred embodiment, the first rod 170 extends through openings formed in each leg 166a, 166b. Preferably, a plurality of openings is formed in each leg 166a, 166b, as illustrated, so that the first rod 170 can be repositioned to adjust the amount of vertical movement of the slide assembly.

The proximal end of the first leg 166a is pivotally secured to the first fixed bracket 130a, and is positioned to engage the plate 134 and, more particularly, the set screws 134a, when the lever assembly is in the lifted position. The proximal end of the second leg 166b is pivotally received between the second fixed bracket 130b and a backing plate 178, which provides a latch or stop surface 178a to releasably retain the lever assembly in an intermediate position, as will be described hereinafter. Adjacent the second leg 166b, the first rod 170 includes an ear 170a to which is secured a lower end of a biasing spring 172 of the latching assembly.

The link arm 162 has a first end rotatably secured to the first rod 170 and a second end rotatably secured to the second rod 158. Preferably, bearings or bushings are provided between the link arm 162 and the first rod 170 and between the link arm 162 and the second rod 158 to reduce friction during rotation of the link arm 162 relative to the first and second rods 170, 158.

With reference to FIGS. 13–16, the latching assembly, which is slidably supported by the second leg 166b and biased into engagement with the backing plate 178, includes the biasing spring 172 and a latch arm 174. The latch arm 174 is generally L-shaped, and includes a grip portion 174a and a sliding portion 174b. The sliding portion 174b, which extends along an inside surface of the second leg 166b, defines first and second spaced apart elongated mounting openings 174b', 174b" and a latch surface 174c.

The first rod 170 extends through the first elongated opening 174b', which is provided near a lower end of the sliding portion 174b. A mounting bolt 175 extends through the second mounting opening 174b", which is located near the grip portion 174a and is received in the second leg 166b. Accordingly, the sliding portion 174b is retained on the second leg 166b while being slidably movable relative thereto.

A mount 176 for an upper end of the biasing spring 172 is provided by the latch arm sliding portion 174b adjacent the second elongated opening 174b" while the mount for the lower end of the biasing spring 172 is provided by the first rod ear 170a, as illustrated. The biasing spring 172 urges the lower end of the sliding portion 174b toward the backing plate 178 and, more specifically, biases the latching surface 174c of the latch arm 174 into engagement with the backing plate stop surface 178a.

A method for using the aforementioned apparatus 102 for supporting the door 104 as it is removed from a vehicle will hereinafter by described. According to the method, the lever assembly is operated to move the slide assembly into the intermediate or insertion position in which the holders 140a and the hook arm 154 are aligned with the upper and lower openings 104a, 104b, respectively, formed in the door 104. Naturally, the angular orientation of the door support beam 140 relative to the vertical bar 144 and lower bar 138 and, hence, the vertical position of the holders 140a, will be adjusted beforehand to permit alignment of the holders 140a with the upper door openings 104a.

The insertion position is the previously-described intermediate position (FIGS. 4, 5, 10, 13, 15) in which the lever assembly is between the lifted position (FIGS. 2, 3, 9, 14) and the lowered position (FIGS. 1, 6, 7, 11, 16) and, preferably, is a position in which the handle assembly is rearwardly extending and at an angle between horizontal and vertical. In such a position, the latching surface 174c provided by the sliding portion 174b of the latch arm 174 is in engagement with the stop surface 178a provided by the backing plate 178 so as to retain the lever assembly in the desired orientation during insertion of the door holders 140a into the upper door openings 104a.

Once the holders 140a and hook arm 154 are aligned with the door openings 104a, 104b, the holders 140a are inserted into the upper door openings 104a, and the door engaging portion 154b of the hook arm 154 is inserted into the lower door opening 104b. The angled leading surface 154b" of the hook arm 154 will be bumped or cammed up and over the edge of the door 104 surrounding the lower door opening 104b such that the notch 154b' receives the edge of the door adjacent the lower door opening 104b. Preferably, the arm is biased downwardly (to a horizontal position) by the hook support 156 to encourage engagement between the door 104 and hook notch 154b'.

Figure 2:
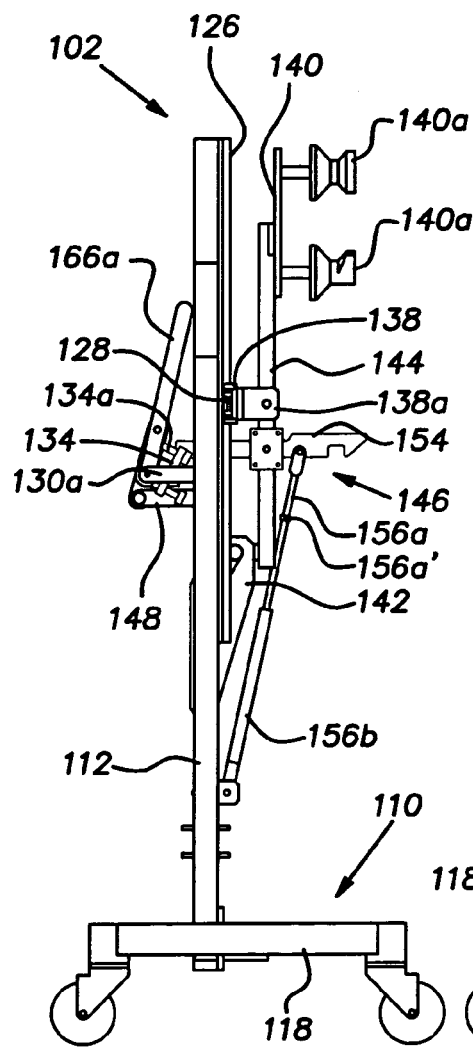
FIG. 2 is a left side elevational view of the door lifting apparatus according to the present invention with a lever assembly shown in the lifted position.
Figure 3:
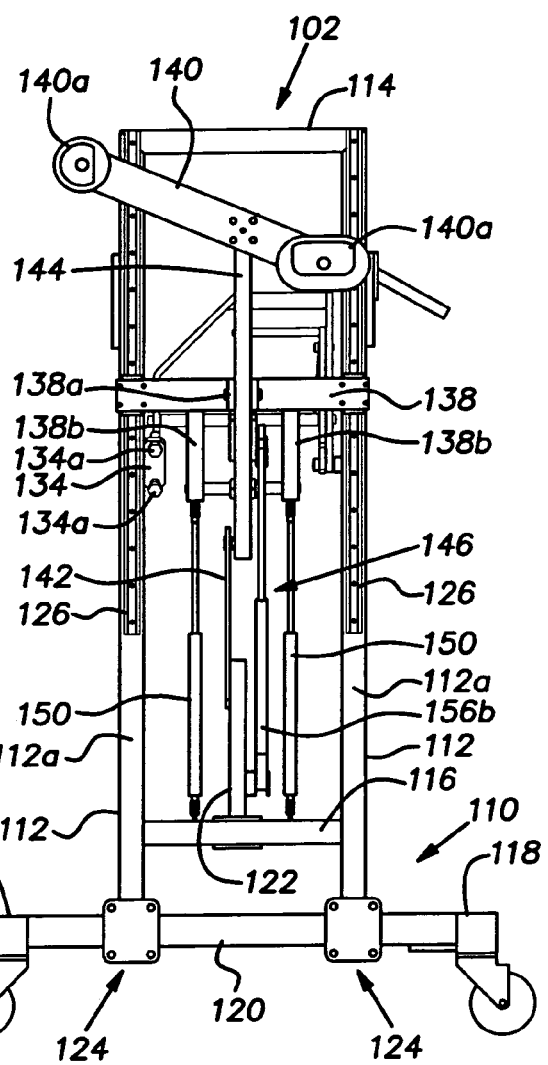
FIG. 3 is a front elevational view of the door lifting apparatus according to the present invention with the lever assembly shown in the lifted position.
Figure 4:
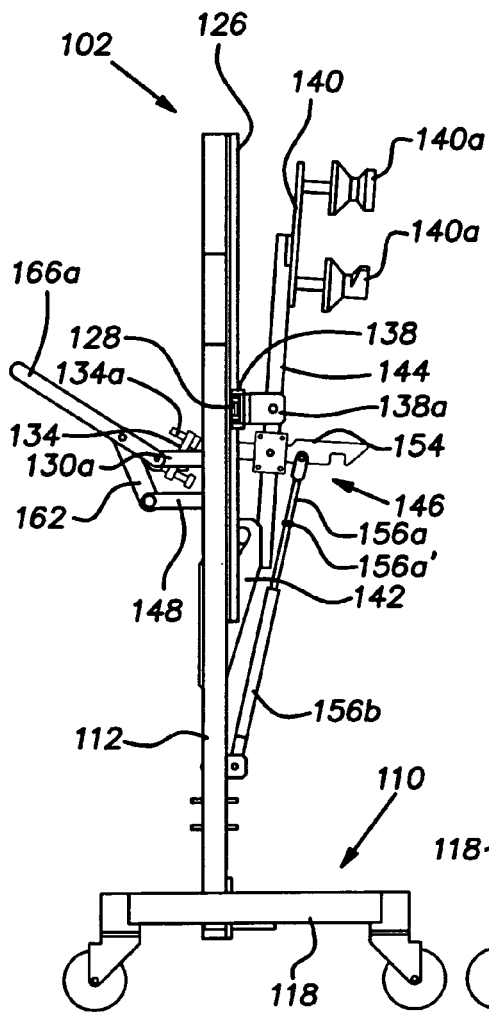
FIG. 4 is a left side elevational view of the door lifting apparatus according to the present invention with the lever assembly shown in an intermediate or insertion position.
Figure 5:
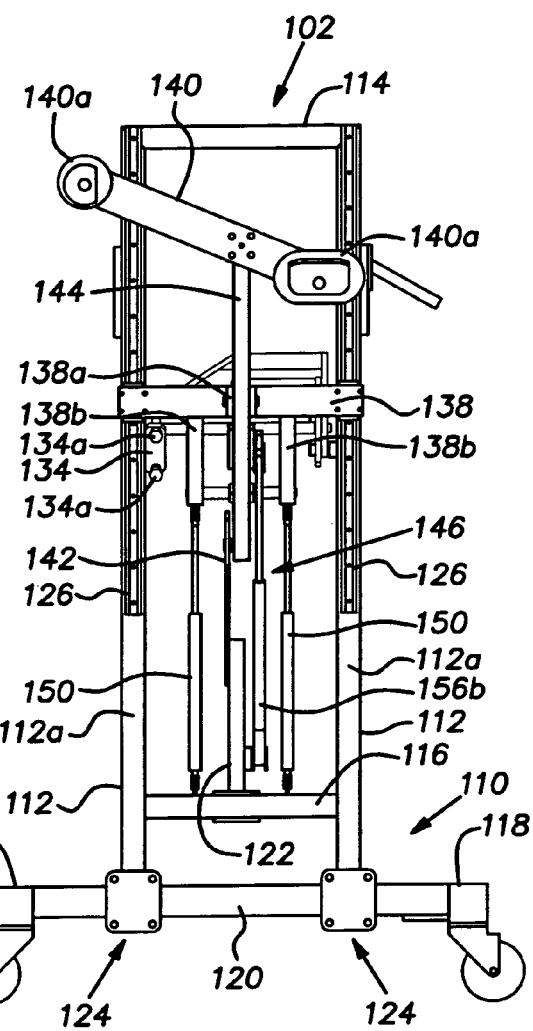
FIG. 5 is a front elevational view of the door lifting apparatus according to the present invention with the lever assembly shown in the intermediate position.
Figures 14, 15, 16:
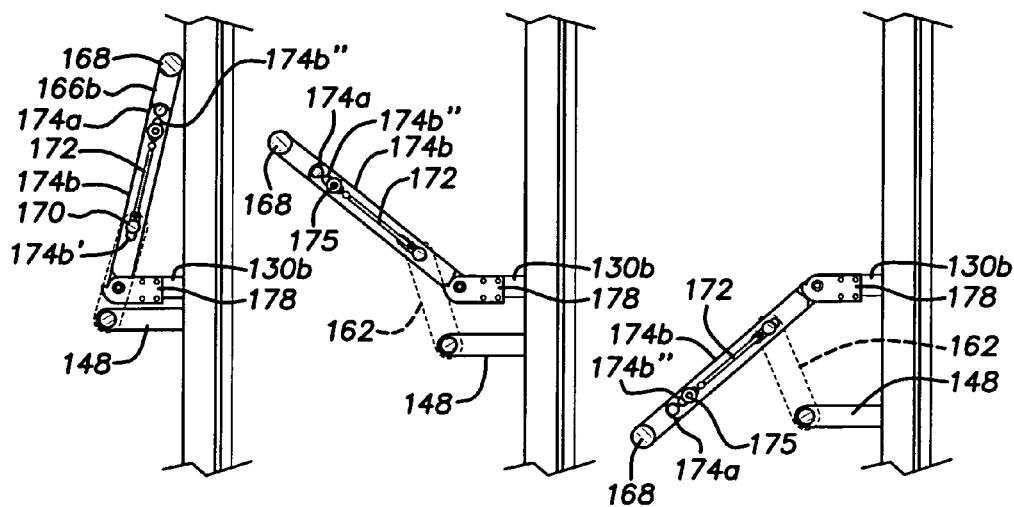

Thereafter, the operator grasps the handle grip 168, and rotates the lever assembly upwardly and toward the frame so as to move the slide assembly vertically upward from the insertion position to the lifted position (i.e., from the position of FIG. 15 to the position of FIG. 14). Accordingly, the lower bar 138 and vertical bar 144 move upwardly slightly, causing the door support beam 140 to move upwardly as well. Moreover, the sliding action of the cam pin 152 provided by the lower end of the vertical bar 144 in the angled upper portion 142a" of the cam plate elongated slot 142 causes the vertical bar 144 and, hence, the door support beam 140 and associated door holders 140a, to rotate from a slightly forward inclination (FIG. 4) to a substantially upright condition (FIG. 2).

Thus, movement of the lever assembly from the insertion position to the lifted position causes the door holders 140a to engage the door 104 adjacent the upper door openings 104a so as to bear the weight of the door when the hinge pins are subsequently removed. Further, since the lever assembly is rotated past vertical in the lifted position, the weight of the door 104 prevents the handle assembly from rotating away from the frame, and there is no risk of the lever assembly accidentally rotating from the lifted position (e.g., FIG. 14) to the lowered position (e.g., FIG. 16). It is noted that no manual action of the latching assembly is required during movement from the intermediate position to the lifted position as the sliding portion 174b of the latch arm 174 merely slides or cams over the surface of the backing plate 178 as the lever assembly is rotated upwardly toward the frame.

Once the apparatus is in the lifted position, the door hinge pins may be removed from the door hinges while the door lifting apparatus 102 supports the door 104. As the door holders 140a are in engagement with the door 104, the position of the door is substantially unchanged following removal of the hinge pins therefrom. Moreover, as the hook arm 154 engages the lower portion of the door adjacent the lower door opening 104b and cooperates with the door holders 140a to form a three point connection or support for the door, the door 104 does not swing upon removal of the hinge pins, as would otherwise be expected, even as the door 104 is subsequently rotated into a tilted condition. Once the hinge pins are removed, the door 104 may be removed from the vehicle and transported (i.e., pushed/pulled) to a desired location by pushing/pulling the apparatus 102.

When the door 104 is at the desired destination, the operator may lower the door, for example onto a support platform, by pivoting the lever assembly downwardly and thereby moving the slide assembly vertically downward from the lifted position (FIG. 2), past the intermediate position (FIG. 4), and into the lowered position (FIG. 6). In this regard it is noted that, when the lever assembly reaches the intermediate position (FIG. 4), the latch assembly will engage. More specifically, the latch surface 174c of the sliding portion 174b will engage the stop surface 178a of the backing plate 178.

Accordingly, in order to rotate the lever assembly beyond the intermediate position, the operator will have to manually grasp the latch assembly grip portion 174a and pull the grip portion 174a toward the grip 168 of the handle assembly against the bias of the spring 172. In this regard it is noted that interaction between the latch surface 174c and the stop surface 178a prevents unintended lowering of the slide assembly and the door 104 disposed thereon.

Once the latching action between the latch surface 174c and the stop surface 178a is overcome, the lever assembly is simply rotated from the intermediate position toward the lowered position. The slide assembly moves downwardly, which means that the lower bar 138 moves downwardly along the rails 126, and the vertical bar 144 moves downwardly therewith. Since the lower end of the vertical bar 144 is guided via sliding action of the camming pin 152 within the elongated slot 142a of the cam plate 142, the vertical bar 144 pivots about the pivotal mounting point (P) such that the lower end of the vertical bar 144 draws closer to the frame while the upper portion of the vertical bar 144, and the door support beam 140 secured thereto, moves relatively farther away from the frame (compare FIG. 4 to FIG. 6). Accordingly, the door 104 is placed in a proper orientation (i.e, slightly tilted or angled) for placement on the support platform.

The door 104 engages the support platform (not shown) just prior to the lever assembly and the slide assembly reaching the lowered position. As the door engages the support platform (not shown) the stop 156a' provided on the hook support inner portion 156a engages the hook support outer portion 156b and causes the hook arm door engaging portion 154b to pivot upwardly, releasing the door 104 from the notch 154b'. Should the stop 156a' be improperly positioned on the inner portion 156a, or should the door bind with the hook notch 154b', the operator may simply push the handle portion 154a of the hook arm 154 downwardly to manually release the door 104 from the hook arm 154.

With the door released from the hook arm 154 and now supported by the support platform, further downward movement of the lever assembly and, thus, the slide assembly, into the lowered position causes the door holders 140a to move downwardly relative to the door openings 104a, freeing the apparatus 102 from the door 104. With the door placed upon and supported by the support platform, and the holders 140a and hook arm 154 disengaged from the door 104, the apparatus 102 may be simply pulled away from the support platform so as to withdraw the holders 140a from the door openings 104a, and thereby disengage the door 104 from the door lifting and transporting apparatus 102.

As will be apparent to those skilled in the art, during movement of the lever assembly from the lifted position toward the lowered position, a first end of the link arm 162, which is rotatably secured to the first rod 170, is first moved away from the frame and then moved back toward the frame. During this movement of the first end of the link arm 162, the second end of the link arm 162, and the second brackets 148 associated therewith, are forced to move downwardly. Downward movement of the second brackets 148 causes the lower bar 138, vertical bar 144, door support beam 140, and holders 140a, together with the door 104 disposed thereon, to move downwardly as the glides 128 slide downwardly over the rails 126. Similarly, when the handle assembly is pivoted from the lowered position toward the lifted position, the link arm 162 applies an upward force on the second brackets 148 and, hence, the lower bar 138, vertical bar 144, and door support beam 140, thereby forcing the slide assembly to move upwardly as the glides 128 slide upwardly over the rails 126.

As the slide assembly is moved downwardly, the biasing device 150 applies an upward force on the slide assembly and thereby helps to support the weight of the door 104 as the door is lowered. Similarly, as the slide assembly is moved upwardly, the biasing device 150 applies an upward force on the slide assembly and thereby assists in raising the slide assembly and the door 104 disposed thereon.

The door lifting and transporting apparatus 102 according to the present invention is preferably formed from a durable material such as steel. Portions of the door lifting and transporting apparatus may be formed from other materials. For example, the handle grip 168 and the latch assembly grip portion 174a may be provided with a cushioning material. The door holders 140a and hook arm 154 may be formed of a thermoplastic material to reduce noise and to prevent damage to the door 104.

Although the present invention has been described hereinbefore with particularity, the present invention is not limited thereto. Rather, it is considered apparent that the method of the present invention is capable of numerous modifications, replacements of steps, and rearrangements of steps without departing from the scope and spirit of the invention as defined in the claims appended hereto.

What is claimed is:

1. A door lifting and transporting apparatus, comprising:
a frame; and,
a lift mechanism comprising a slide assembly and a lever assembly, the slide assembly being slidably disposed upon the frame for vertical movement and being adapted to support a door, the lever assembly being secured to said slide assembly and said frame such that pivoting of said lever assembly causes said slide assembly to move vertically along said frame;
wherein the slide assembly includes a lower bar that is slidably secured to the frame, a vertical bar that is pivotally secured to the lower bar, and a door support beam that is affixed to the vertical bar and pivots with the vertical bar relatively toward and away from the frame as the lever assembly is lifted and lowered thus allowing the door disposed on the slide assembly to tilt from a substantially vertical orientation to a tilted configuration as the slide assembly is moved from a lifted position toward a lowered position.

2. The apparatus according to claim 1, wherein the door support beam affixed to an upper end of the vertical bar.

3. The apparatus according to claim 1, wherein the door support beam includes door holders that are adapted to extend into openings formed in the door and to support the door during lifting and lowering, said door support beam being adjustably affixed to said vertical bar.

4. The apparatus according to claim 3, wherein said slide assembly further comprises a hook assembly that is adapted to engage and releasably hold a lower portion of the door as the door is moved into the lowered position, and thereby helps to retain the door in a tilted orientation.

5. The apparatus according to claim 4, wherein the hook assembly includes a hook arm that is pivotally movable between an engaged position in which the door is held and a disengaged position in which the door is released.

6. The apparatus according to claim 5, wherein the hook assembly includes means for moving the hook arm from the engaged position to the released position as the door is moved into the lowered position so as to release the door from the door holder.

7. The apparatus according to claim 6, wherein the frame includes a cam plate that is slidably engaged with a lower end of said vertical bar so as to cause said vertical bar lower end to pivot as said vertical bar is moved from said lifted position toward said lowered position.

8. The apparatus according to claim 1, wherein said lever assembly is movable between said lifted position, said lowered position, and an intermediate position between said lifted position and said lowered position, and wherein said lever assembly includes a latch arm, said latch arm having a latching surface that engages a stop to releasably hold said lever assembly in said intermediate position, said lever assembly being releasably secured in said intermediate position so as to prevent unintended movement directly from said lifted position to said lowered position.

9. The apparatus according to claim 8, further including a biasing spring that is operable to urge the latch arm into engagement with said stop, said latch arm being movable against said spring bias to release said latching surface from said stop and thereby permit said lever assembly to be rotated from said intermediate position toward said lowered position.

10. The apparatus according to claim 9, wherein the slide assembly includes a lower bar that is slidably secured to the frame, a vertical bar that is pivotally secured to the lower bar, and a door support beam that is affixed to an upper end of the vertical bar and pivots with the vertical bar relatively toward and away from the frame as the lever assembly is lifted and lowered.

11. The apparatus according to claim 10, wherein the door support beam includes door holders that are adapted to extend into openings formed in the door and to support the door during lifting and lowering, said door support beam being adjustably affixed to said vertical bar.

12. The apparatus according to claim 11, wherein said slide assembly further comprises a hook assembly that is adapted to engage and releasably hold a lower portion of the door as the door is moved into the lowered position, and thereby helps to retain the door in a tilted orientation.

13. The apparatus according to claim 12, wherein the hook assembly includes a hook arm that is pivotally movable between an engaged position in which the door is held and a disengaged position in which the door is released.

14. The apparatus according to claim 13, wherein the hook assembly includes means for moving the hook arm from the engaged position to the released position as the door is moved into the lowered position so as to release the door from the door holder.

15. The apparatus according to claim 14, wherein the frame includes a cam plate that is slidably engaged with a lower end of said vertical bar so as to cause said vertical bar lower end to pivot as said vertical bar is moved from said lifted position toward said lowered position.

16. A method for lifting and supporting a vehicle door, comprising the steps of:
providing an apparatus including a frame and a lift mechanism, said lift mechanism including a slide assembly and a lever assembly, said slide assembly including a lower bar that is slidably secured to the frame, a vertical bar that is pivotally secured to the lower bar, a door support beam and a plurality of door holders, said door holders being disposed on the door support beam and adapted to support the door, said lever assembly being secured to said slide assembly and said frame such that pivotal movement of said lever assembly moves said door support beam vertically relative to said frame, said lever assembly and said slide assembly being movable between a lifted position, an intermediate position, and a lowered position, wherein said door support beam moves laterally away from said frame as said lever assembly and said door support beam are moved from said lifted position toward said lowered position;

moving said lever assembly and said slide assembly into the intermediate position from said lifted position so as to align said door holders with openings in the door;

inserting the holders into the door openings;

moving said lever assembly and said slide assembly into said lifted position;

removing hinge pins from the door;

removing the door from the vehicle while the door is supported on the door holders; and, moving said lever assembly from said lifted position toward said lowered position while moving said door from a generally vertical orientation into a tilted orientation.

17. The method according to claim 16, wherein said lever assembly includes a latch mechanism, said method including the further steps of:
engaging said latch mechanism as said lever assembly is moved into said intermediate position from said lifted position; and,
disengaging said latch mechanism to move said lever assembly from said intermediate position to said lowered position.

18. The method according to claim 16, wherein said slide assembly further includes a hook arm that is operable to engage and hold said door, comprising the further steps of:
engaging said hook arm with said door when said lever assembly is initially in said intermediate position; and,
disengaging said hook arm from said door when said lever assembly approaches said lowered position.

19. The method according to claim 18, wherein said lever assembly includes a latch mechanism, said method including the further steps of:
engaging said latch mechanism as said lever assembly is moved into said intermediate position from said lifted position; and,
disengaging said latch mechanism to move said lever assembly from said intermediate position to said lowered position.

* * * * *